Figure 1:
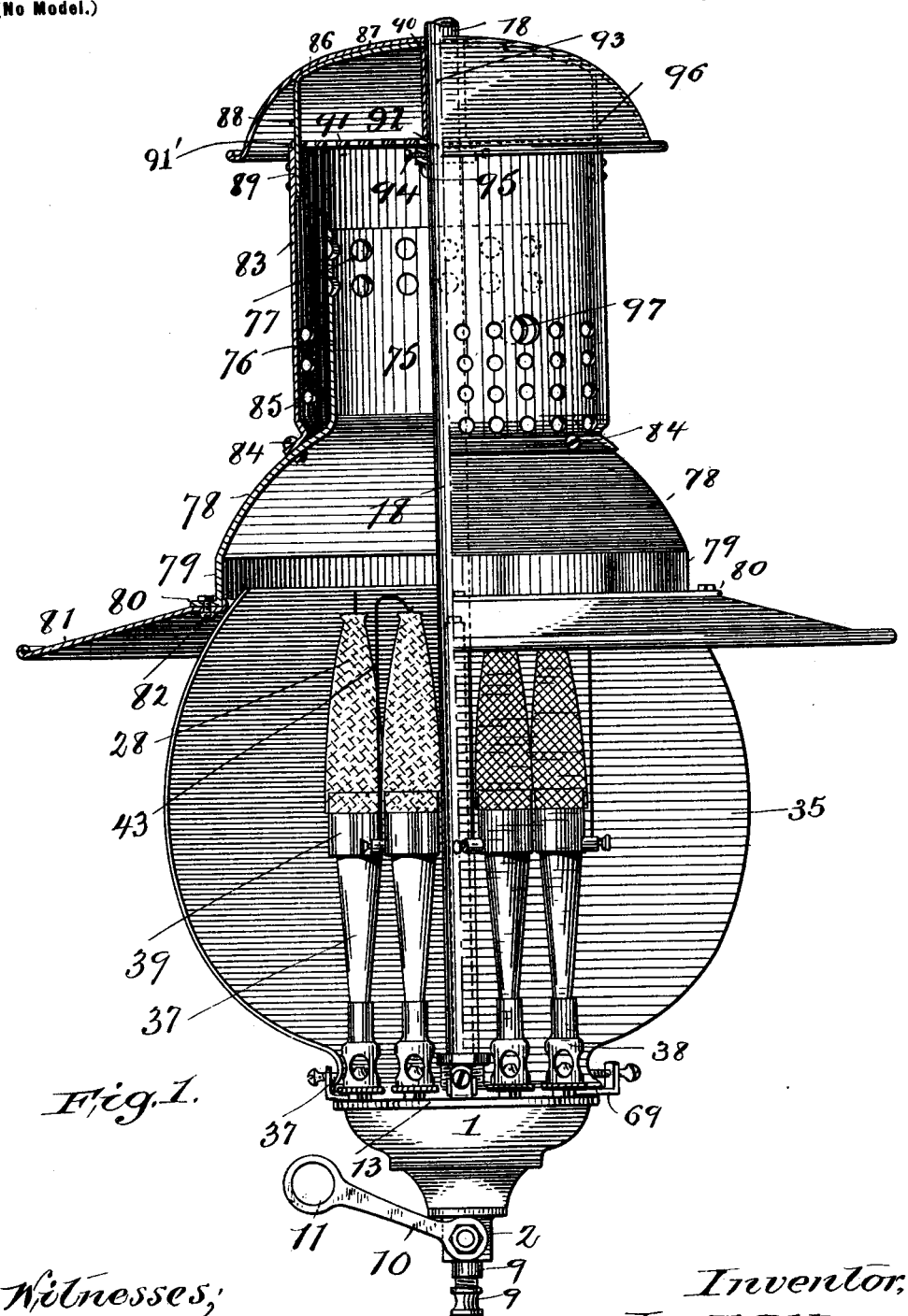

No. 676,020. Patented June 11, 1901.
L. T. ALTON.
INCANDESCENT GAS LAMP.
(Application filed Feb. 26, 1900.)
(No Model.) 3 Sheets—Sheet 1.

Witnesses;
Orr Benjamin
Chas. G. Hurley

Inventor;
Lee T. Alton
by Joseph L. Levy
atty

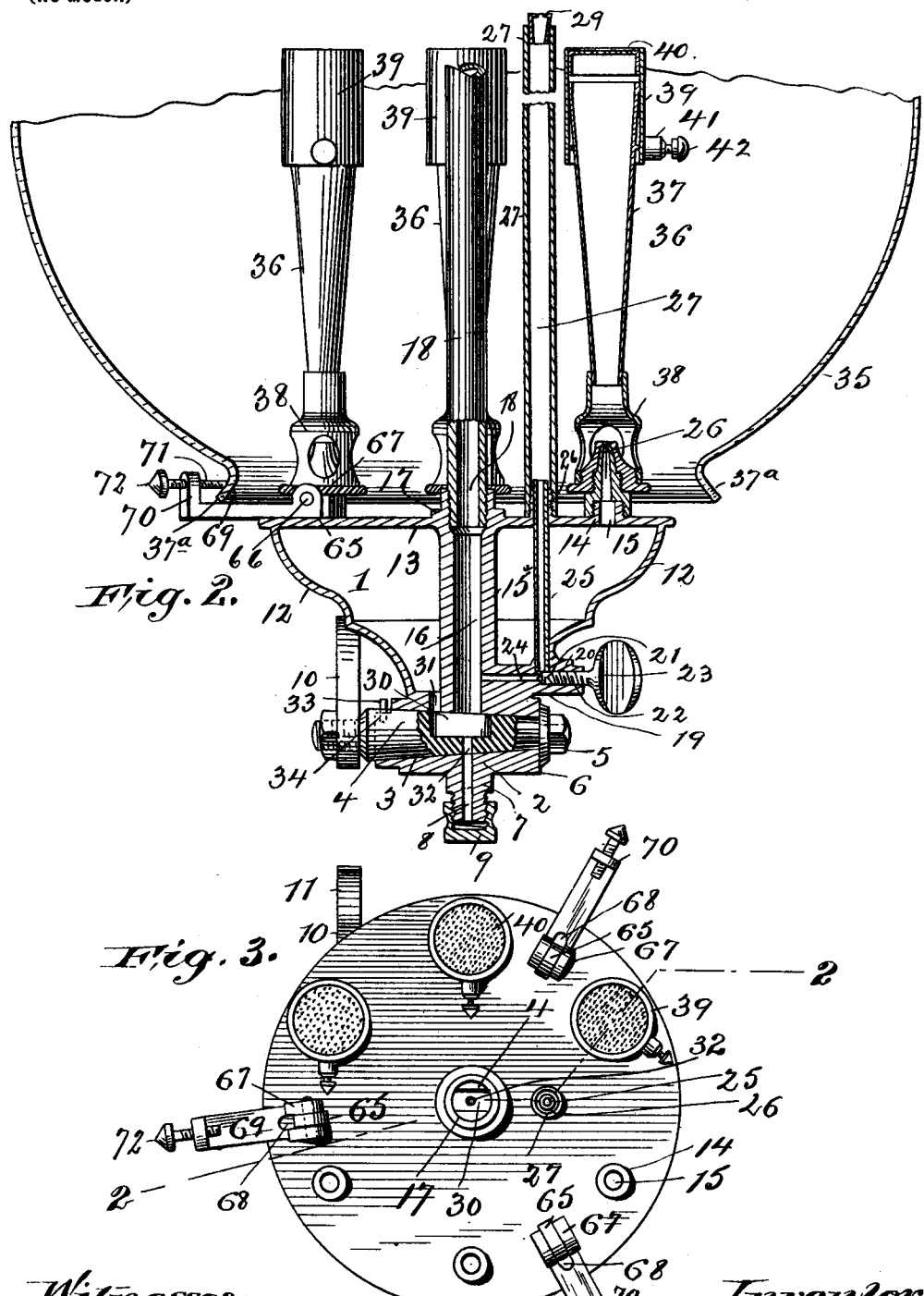

No. 676,020. Patented June 11, 1901.
L. T. ALTON.
INCANDESCENT GAS LAMP.
(Application filed Feb. 26, 1900.)
(No Model.) 3 Sheets—Sheet 3.
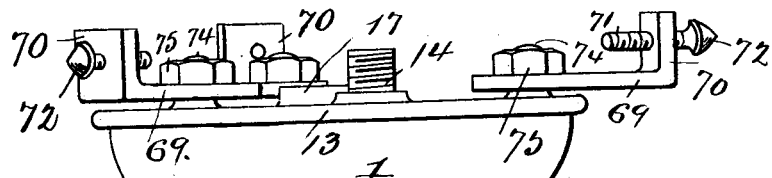
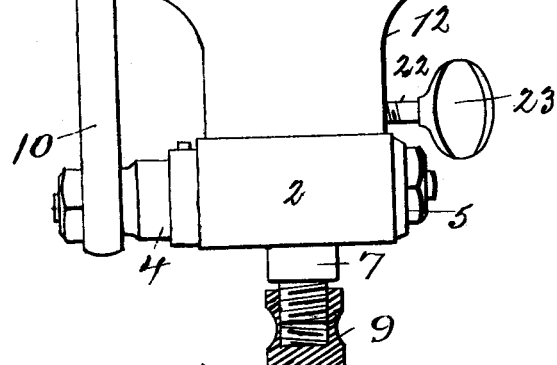
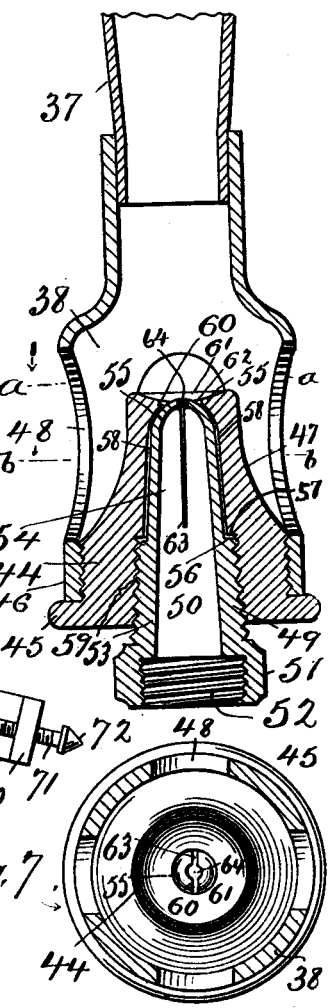
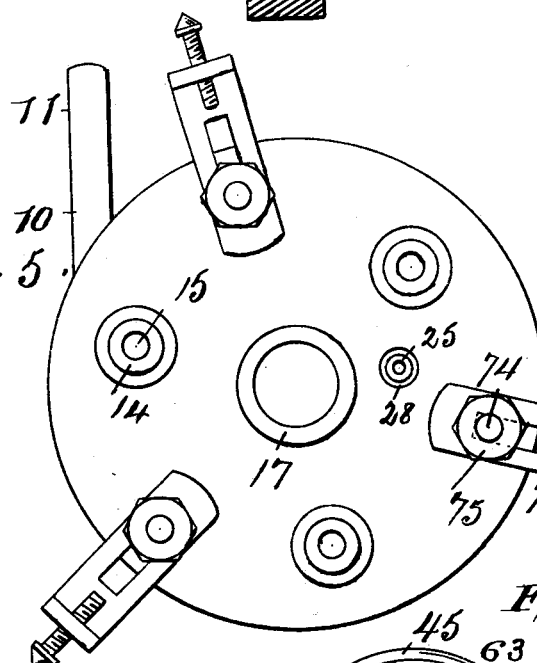
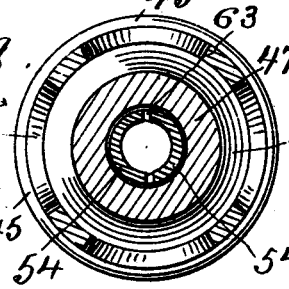
Witnesses:
C. W. Benjamin
Chas. G. Hensly
Inventor:
Lee T. Alton,
by Joseph L. Levy
atty

UNITED STATES PATENT OFFICE.

LEE T. ALTON, OF BROOKLYN, NEW YORK.

INCANDESCENT GAS-LAMP.

SPECIFICATION forming part of Letters Patent No. 676,020, dated June 11, 1901.

Application filed February 26, 1900. Serial No. 6,482. (No model.)

*To all whom it may concern:*

Be it known that I, LEE T. ALTON, a citizen of the United States, residing at the city of New York, borough of Brooklyn, county of Kings, State of New York, (and whose post-office address is 1244 Fulton street, in said city,) have invented certain new and useful Improvements in Incandescent Gas-Lamps, of which the following is a specification.

The object of my invention is to improve generally on the construction of incandescent gas-lamps, to the end that a more efficient, stable, and economical lamp will result.

The improvements hereinafter described relate more especially to that class of incandescent gas-burners which are known in the art as "arc-lamps," and which are especially adapted for employment in open-air situations, and in which a number of incandescent gas-burners are grouped together to form a close resemblance to the conventional arc-lamp.

My invention therefore consists in the details of construction and combination of parts hereinafter described, and finally pointed out in the claims.

In the drawings forming part of this specification, Figure 1 is a front elevation of a lamp embodying my improvements, one-half being in sectional elevation. Fig. 2 is an enlarged sectional elevation of the lower portion of the lamp, showing the reservoir, said section being taken on the line 2 2, Fig. 3. Fig. 3 is a plan view of Fig. 2 with the transparent globe removed. Fig. 4 is a side elevation of the base of the lamp, showing a modification of the globe-brackets. Fig. 5 is a plan view thereof. Fig. 6 is a sectional elevation, enlarged, of the base of the incandescent burner, showing the regulating-check. Fig. 7 is a transverse sectional view of the same on the line *a a*, Fig. 6; and Fig. 8 is a like view on the line *b b*, Fig. 6.

I shall proceed to describe these improvements in groups, so that they will be the better understood.

The first part of my invention relates to an arrangement whereby the gas supplied to the burner becomes superheated before entering the reservoir from which it is fed to the plurality of burners, whereby a more thorough admixture of air and gas is obtained, the arrangement being such that the air adjacent the burners is confined and heated before its combination with the burners, so that the preheated gas and preheated air are caused to combine and the more thoroughly mixed, thereby producing a more intense combustion, a great volume of light, and a more economic combustion of the gas. To attain these results, I inclose the burners in a transparent globe, so as to confine the air adjacent the burners and which is to be heated, and I preferably suspend the burners from above, supplying the gas from a source preferably located above the burners to the reservoir located below the burners and to which the latter connect.

An embodiment of my invention by means of which the above results are obtained and which includes improvements in the valve for controlling the passage of gas from the source of supply to the burners is as follows:

At 1 is the gas-reservoir, constructed in any desired manner, preferably partly of cast metal and partly of sheet metal properly formed and secured together, at the base of which is a valve-casing 2, having transversely extending therethrough a conical bore 3 for the conical valve 4, provided with a set-nut 5 at its end, abutting against the shoulder 6 of the casing, a depending nipple 7, having a bore 8 and which nipple is exteriorly screw-threaded to take a cup 9 detachably thereon, the outer end of the valve 4 being provided with an operating-lever 10, having an eye 11 to receive an implement for operating the valve from below and at a height from the ground. The limits of the reservoir are defined by the side walls 12, flaring outwardly, upon which is mounted a crown-sheet 13, having nipples 14 extending therefrom, which nipples have bores 15 leading into the reservoir 1 and which are screw-threaded on the exterior to receive the parts hereinafter described.

Extending from the crown-sheet to the valve-casing and through the reservoir is a tube 15ª, having a central bore 16, entering into the bore 3 of the valve-casing and alining with the bore 8 in the nipple 7, the bore 16 opening out from the top 13 of the reservoir through a nipple 17, which nipple is exteriorly screw-threaded to receive the gas-supply pipe 18, which also forms means for supporting the lamp from above.

As shown already in Fig. 2, the valve-casing is provided with a transverse enlargement 19, having a boss 20 extending outwardly therefrom, the boss being provided with a tapped bore 21 to receive the threaded stem 22 of a regulating-valve 23, and from the bore extends a continuation 24, preferably of smaller diameter than the bore 21. The boss 20 is perforated to receive a short tube 25, leading into the larger bore 21 of the regulating-valve, which tube extends upwardly through the reservoir and through a nipple 26, formed on the crown-sheet 13, the nipple 26 being exteriorly screw-threaded to receive a tube 27, extending upwardly and terminating a short distance below the tops of the mantles 28, preferably as indicated in Fig. 1, which tube carries a burner-tip 29. This latter construction provides a by-pass by means of which a small flame is constantly maintained to ignite the gas passing from the burners in the first instance, which is supplied constantly by gas from the main supply-tube, capable of regulation by the valve 23.

The valve is provided with a longitudinally-extending groove 30, forming a port alining with the bore 16 of the tube 15 and a port 31, extending through the valve-casing into the reservoir, the valve being provided with a further port 32, extending from the main port 30 into alinement with the bore of a nipple 7 when the valve is turned to admit gas from the source of supply into the reservoir, the gas passing from the reservoir-tube 15 through the ports 30 31 into the reservoir and from thence to the burners, as hereinafter described. The liquefied gas or water, should any be formed, passes through the valve into the cup 9 and is there retained, and can be ejected by removing the cup and allowing the gas-pressure to blow through the valve and out of the nipple, thus effectually catching the drip and cleaning the valve. The valve is also provided with a pin 33, adapted to arrest its rotation by contact with a shoulder 34 on the valve-casing at either side, so as to limit the motion of the valve in opening and closing communication between the tube 15 and the reservoir and the valve and the drip-cup.

At 35 is the globe, inclosing the burners 36, which is provided at the base with a peripheral flange 37ª for engagement with the securing means hereinafter described and surmounting both the burners and the globe, and surrounding the supply-pipe is a hood adapted to control the air-currents and to use and discharge the heated air for better combustion, as hereinafter described.

The burners illustrated herein are of the class described in my application for patent for incandescent gas-burner, filed August 5, 1897, Serial No. 647,145, and which I prefer to use in connection with this lamp; but other forms of burners may be employed.

The burner shown, briefly, comprises the conical tube 37, secured at the smaller and lower end to the top of a dome-like and perforated air-chamber 38, the burner-tube 37, carrying a burner tube or cap 39, supported on the top thereof and provided with a perforated diaphragm 40, the cap having a stud 41 and set-screw 42 for securing the suspending-rods 43 for the mantle 28, the air-dome 38 being secured indirectly upon the crown-sheet 13 of the reservoir through the intervention of the regulating-check hereinafter described.

From the foregoing it will be seen that the air within the globe will be heated and the gas passing through the supply-pipe into the reservoir will be heated, the combustion at the burner-tips forming in the heated air within the globe an induced current and drawing it into the perforated air-chamber or dome 38, where it commingles with the heated gas passing from the service-pipe to the reservoir, the gas being heated in said pipe by the proximity of the combustion of the gas thereto.

The port 30 permits of the admission of gas to the valve and discharge of the same through the same valve-opening into the reservoir without preventing the passage of the gas.

Another portion of my invention relates to the construction of means for regulating and checking the volume and passage of the gas to the burners from its or their source of supply.

At 44 is a movable nut having a base-piece provided with a flange 45, providing means for rotation of the nut, the base being exteriorly screw-threaded to receive the interior thread at the base 46 of the dome, by means of which the burner is supported, the nut 44 being provided with an upwardly-extending conical projection 47, located within and preferably below the tops of the air-inlets 48 of the dome, and at 49 is the stationary element of the check, consisting of a conical plug formed with a bore 50 and a lateral extension or enlargement forming a nut 51, the interior 52 of which is enlarged and threaded to allow of its being secured to the nipple 14, extending upwardly from the crown-sheet of the reservoir, as indicated in Fig. 2. The plug 49 has an intermediate conical stem 53, interiorly screw-threaded, and a nose 54 extending therefrom, surmounted by a converging crown 55.

It is not essential that the stem and nose be conical; but I prefer that configuration in order to obtain the wedging action hereinafter described.

The nose 54 of the plug being smaller in diameter than the stem 53 forms a shoulder 56 for coaction with the shoulder 57 in the bore of the nut 44.

The interior of the nut is provided with a bore 58 to receive the nose 54 and an enlargement 59 thereof, interiorly threaded to receive the stem of the plug, so that through the latter the nut may be rotatably supported upon the plug, the upper portion of the nut being flared inwardly, as at 60, to form a converging abutment against which the crown 55 of the plug abuts, the apex of the nut being dish-shaped, as at 61, to provide an outwardly-flaring surface, between which and the bore is formed an annular opening 62. The nose of the plug is made thin, so that its walls may contract or expand, and to produce this result said nose is slitted, as at 63, preferably on both sides, in the direction of its length, and the crown of the nose is provided with an opening 64, slightly larger than the slit therein. The result of this construction is that the burner is suitably supported upon an element of the gas-regulator, which element may be rotated upon the fixed element—namely, the plug secured to the reservoir, the rotation of the movable element or nut upon the plug in either direction contracting or opening the slit in the nose of the plug, thereby regulating the volume of the gas passing therefrom, the binding of the nut upon the plug being prevented by the shoulders 56 57.

The extension of the slit 63 downward is only to give resiliency to the sides of the nose and does not ordinarily admit gas to the bore 58 of the nut. By moving the nut down upon the nose its cap is brought into contact with the inwardly-extending flange 60, thereby compressing the slit across the top of the crown, confining the exit of the gas from the plug to the small central hole 64 and the exposed portion of the transverse slit, as indicated in Fig. 7, the volume of which can be regulated by more or less compression given to the nose of the plug; but should a greater volume of gas be required than will be supplied through the slitted crown and hole while the same is in contact with the flange 60 the nut may be adjusted so as to allow of the gas passing through the slit into the bore 58 and out through the top of the nut. By this means a full unbroken opening for the passage of the gas is maintained without decreasing the existing pressure, at the same time allowing of the regulation of its volume, the result of which is to cause the gas to pass through the regulator in a wide volume, so that it can the more readily commingle with the air. The result is accomplished mainly by the slit and the flaring 61 on the exit from the nut, as previously described.

The hole 64 in the center of the check helps to draw a certain quantity of gas without any obstruction and also to form an induced current in the gas through the slit, causing it to emanate in a long wide column. It is apparent that the degree of flare of the exit from the nut, the size of the hole 64 and slit, and the compression thereof may be varied without departing from the essence of my invention.

Another feature of my invention resides in the means for supporting the transparent globe, allowing it to be placed upon and removed from the lamp while the latter is supported from above, which means involve brackets, the suspending portion of which may be moved inwardly within an area of less diameter than the smallest opening in the globe. To accomplish this result, I may use either form of support shown in Figs. 1, 2, and 3 or a modification thereof, as shown in Figs. 4 and 5, both embracing, however, the principle of inward projection. The prior form embodies an element stationarily supported upon the crown-sheet of the reservoir (or other suitable base) and a vibrational arm carrying means for securing the globe thereto. By reference to Figs. 2 and 3 this support will be seen to comprise an upwardly-extending stud 65, (a description of one support or bracket, there being three radiating from the crown-sheet, sufficing for the description of all of them,) through which stud extends a pivoting-pin 66, passing through upwardly-extending ears 67, formed on each side of the slot 68 in the end of an arm or bracket 69, at the outer extremity of which is an upwardly-extending ear 70, through which is formed a tapped hole for the passage of the stem 71 of a securing-screw 72, which when the globe 35 is in position as shown in Figs. 1 and 2 engages with the circumferential flange 37$^a$ and supports it about the burners and above the reservoir.

It will be noted that by reason of the upper suspension of the lamp it would be impracticable to place the globe thereon from above and that means for supporting the globe must be exterior thereto and be wider than the lower opening thereof. To place the globe in position, it is moved upwardly until the upper rim (which is wide enough to pass fully over the reservoir and burners) strikes the arms 69, which will then be vibrated inwardly and which as the globe is pushed farther up will fall by gravity through the annular opening in the bottom of the globe, and by raising the globe so that the arms clear it they can be swung back, and when the arms are in the lowermost position, as shown in Figs. 2 and 3, the globe can be lowered, so as to rest thereon, and the clamping-screw be moved inwardly to firmly secure the globe in position. To remove the globe, it is detached from the clamping-screw and raised outwardly, so that the arms can be thrown inwardly within the limits of the annular opening in the globe and the globe freed from contact therewith.

The modified construction shown in Figs. 4 and 5 allows of the same operation. The arms 69, carrying the clamping-screw, are provided with a slot 73, through which passes a stem 74, secured to the crown-sheet of the reservoir, upon which is mounted a nut 75. The slot is of such a length as to allow the arms to be either moved inwardly and then vibrated inwardly about the stud as a pivot or the arms can be bodily vibrated inwardly, as from the position shown in Fig. 5 inwardly, the operation being substantially as heretofore described in connection with the construction shown as Figs. 1, 2, and 3.

A further portion of my invention consists in the providing a hood or shield as a protection for the lamp against the action of the elements and which is so constructed as to readily and easily discharge the hot air generated within the globe. It is constructed as follows: At 75 is the main flue, provided at its upper cylindrical extension 76 with a series of perforations 77 and having a lower and flaring base-piece 78, connecting the flue with an annular pendent portion 79, from which extends outwardly an annular flange 80, to which latter is secured a reflector 81, secured thereto in any suitable manner, preferably detachable, as by bolts 82. At 83 is the outer flue, having an outwardly-extending flange 84 at its base, by means of which it is preferably detachably secured to the flared portion 78 of the inner flue 75, which flue is separated from the inner flue, as shown in Fig. 1, the outer flue having perforations 85 at a point below the perforations 77 in the inner flue, which perforations 85 are of smaller diameter than those of the inner flue. Secured to the upper portion of the outer flue is a bail 86, having a curved top 87 and depending ends 88, the latter being secured to the outer flue, as shown at 89, said bail having an aperture, as at 90, Fig. 1, through which the service-pipe 18 passes. At 91 is a perforated disk over the outer flue 83 and detachably secured thereto, and which is provided with an opening 92, through which the service-pipe passes. Extending between the bail and the perforated disk is a loose thimble 93, which surrounds the service-pipe 18, and secured to the pipe 18 by a set-nut 94 is a collar 95, upon which the perforated disks rest, the latter in turn supporting the thimble, and it in turn supporting the bail by means of which the hood is suspended. Over the top of the flues and resting upon the bail is a cowl 96, which will prevent the entrance of rain to the combustion-chamber and which allows of the egress through the perforated disk of the heated air.

In operation the heated air passes out from the inner flue through the perforated disk and from under the cowl, at the same time drawing in cold air through the perforations in the outer flue and from below the globe, thereby creating a perfect draft. It is necessary to discharge hot air, as the quantity of oxygen necessary for feeding the lamp is consumed by the heat of the mantles. Therefore hot air must be discharged rapidly, and by admitting cold air through the outer chamber a more rapid flue action is obtained. In order to admit cold air into the outer flues and to help to cool the inner chamber and to cause the air to strike downwardly into the combustion-chamber, the apertures in the outer flue are made smaller than those of the apertures in the inner flue, the former being located opposite the solid portion of the inner flue and staggered in relation to those in the latter flue. The perforated disk also prevents the wind from going back into the lamp, and both the inner and outer flues are provided with alining apertures 97 to permit of the burners being lighted should the by-pass burner-flame become extinguished.

Although many of the before-mentioned improvements are advantageously employed with an overhead suspended lamp, wherein the gas is heated in its passage to the burners, many of the features of improvements may be advantageously employed in a lamp adapted to be supported below, in which latter event the nipple 7 can be used for supporting and feeding the lamp, and it is also apparent that many of these improvements, in fact, the major portion of them, are capable of application to a lamp having a single burner as well as a cluster-lamp, shown herein.

Having described my invention, I claim—

1. In an incandescent gas-lamp, the combination of a reservoir and grouped burners superposed thereon, a pendent supply-pipe passing through the group of burners and leading to and passing into the reservoir, a valve-casing located at the bottom of said pipe and reservoir, and a valve located in said casing having a port alining with the supply-pipe and reservoir, said valve being interposed between said pipe and reservoir for controlling the passage of gas to the latter, the supply-pipe being disposed relative to the burners, so that the gas will be heated as it passes through the pipe to the reservoir, substantially as described.

2. The combination, in an incandescent gas-lamp, of a supply-pipe, a reservoir, a burner extending upwardly from said reservoir, a valve-casing, a valve having a longitudinal groove, a port in the valve-casing leading to the reservoir, and a duct leading from the supply-pipe to the port in the valve, substantially as described.

3. The combination in an incandescent gas-lamp of a series of burners superposed over a reservoir, passages from the reservoir to the burners, a supply-pipe supporting the reservoir from above, and supplying gas from above to the reservoir below the burners, a valve-casing below the reservoir communicating with the supply-pipe, a valve in the casing having a port opening into the reservoir, and a pilot-light and supply-duct therefor leading from the supply-pipe and independent of the valve and intermediate of the supply-pipe and valve, substantially as described.

4. The combination with the supply-pipe, a by-pass pipe having a burner-tip, a valve-casing, and a valve therein, a duct leading from the service-pipe to the valve-regulated bore of smaller dimension, with which latter the by-pass pipe communicates, said bore being intermediate of the supply-pipe and valve-casing, a shoulder formed at the point of intersection of the by-pass pipe and bore, and a valve in said bore adapted to close the opening of the by-pass pipe into the bore and to abut against the said shoulder, substantially as described.

5. The combination, with a reservoir, having an entrance-port, and a supply-pipe passing therethrough, a valve-casing and a duct leading from the supply-pipe to the valve-casing, the pendent nipple 7 having a bore 8 diametrically alined with the duct, a cap detachably secured to the said nipple, and a longitudinal groove and transverse hole entering the groove formed in the valve and casing adapted to be alined with the bore, supply-pipe and reservoir-port, substantially as described.

6. The combination with the suspended supply-pipe, a reservoir supported thereby and communicating with the supply-pipe, the reservoir having a crown-sheet and a series of burners extending upwardly therefrom, and located within the periphery of said crown-sheet, of a series of globe-supporting arms movably secured to said crown-sheet within its periphery, the said arms being adapted to rest upon the crown-sheet between their inner and outer ends, the total length of said arms being less than the diameter of the crown-sheet, substantially as described.

7. The combination with the suspended supply-pipe, a reservoir communicating with said supply-pipe, and suspended thereby, said reservoir having a crown-sheet about the supply-pipe, the globe-supporting arms movably secured upon the crown-sheet within its periphery, with a globe having a lower opening of smaller dimension than the outer extension of said supporting-arms, whereby said arms may be swung inwardly to clear the said globe-opening and to rest upon the crown-sheet to support the globe, substantially as described.

8. The combination with the reservoir crown-sheet 13, of an upwardly-extending stud 65 thereon, the arms 69, ears 67 on the inner end of the arm forming a bifurcation within which the stud is located, means for pivotally securing the arms to the stud, said arms having a lug 70 provided with a clamping-screw at its outer end, substantially as described.

9. In a regulating-check for an incandescent gas-lamp, the combination with the plug having a threaded base and a continuous tubular bore, inwardly-converging and resilient upper sections, and a nut movable on the base having a convergent and annular flange adapted to compress said resilient sections, substantially as described.

10. In an incandescent gas-burner, the combination with a plug having a threaded base, a tubular bore and resilient upper sections, a nut movable on the base having an annular flange adapted to compress said resilient sections, an aperture formed in the annular flange above said resilient sections, an air-mixing chamber secured to a nut, and a burner supported on said chamber, substantially as described.

11. In a regulating-check for an incandescent gas-burner, the combination with a hollow plug having a nose provided with a longitudinal slit and an opening in a crown of the said nose, a nut having a converging flange and an opening therethrough, and a flared surface leading from the last-mentioned opening outwardly, substantially as described.

12. In a gas-lamp, the combination with a gas-burner, of an inner flue having a base portion to which a reflector is secured, the upper portion of said flue being provided with apertures, and an outer flue secured to said base portion below the apertures in the inner flue, and extending above the apertures in the latter flue, apertures formed in the outer flue below the apertures in the inner flue, and an apertured disk 91 on the outer flue, a pipe 18, and means for securing said flues and disk to the pipe and over the burners, substantially as described.

13. The combination in a gas-lamp, of a supporting-pipe, an inner flue having a flared base, and a reflector extending therefrom, an outer flue secured to said flare, a bail secured to the outer flue and about the pipe, a thimble on said pipe supporting the bail, a collar 95 on the pipe and supporting the thimble, means for holding said collar on the pipe and a cowl supported over the outer flue, substantially as described.

14. In an incandescent gas-lamp, the combination with the reservoir supported by a pipe 18, and burners extending from the reservoir adjacent to said pipe, a globe 35 supported on the reservoir about the burners, an inner flue inclosed in an outer flue, the outer one being secured to the inner one, a perforated disk 91 upon the open end of the outer flue, and means for supporting the flues on the pipe, and over said burners, substantially as described.

Signed at the city of New York, county of New York, and State of New York, this 23d day of February, 1900.

LEE T. ALTON.

Witnesses:
CHAS. G. HENSLEY,
SOPHIA SEKOSKY.